Patented May 26, 1953

2,640,055

UNITED STATES PATENT OFFICE 2,640,055

AMIDES

John A. King, Manhasset, and Freeman H. McMillan, New York, N. Y., assignors to Warner-Hudnut, Inc., New York, N. Y., a corporation of Delaware No Drawing. Application January 6, 1951, Serial No. 204,818

1 Claim. (Cl. 260—294)

This invention relates to new chemical compounds of utility in the pharmaceutical field.

In accordance with this invention, there are provided N-substituted -(2-pyridyl)- and -(2-piperidyl)-alkanamides and salts thereof, i. e. compounds of the general formula

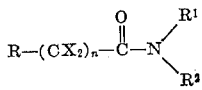

wherein X denotes hydrogen or a short chain alkyl group containing not over 3 carbon atoms; $n$ is an integer from 1 to 5; R stands for the radicals 2-pyridyl or 2-piperidyl; $R^1$ stands for hydrogen, alkyl, hydroxyalkyl, dialkylaminoalkyl, aralkyl or aryl radicals, and $R^2$ stands for alkyl, hydroxyalkyl, dialkylaminoalkyl, aralkyl or aryl radicals, or $R^1$ and $R^2$ together form, with the amide nitrogen, a heterocyclic ring such as the piperidine or morpholine ring. The invention also comprises acid addition salts of the above compounds with either organic or inorganic salts, as well as quaternary ammonium salts thereof.

The compounds of our invention may be prepared by reacting a corresponding lower alkyl ester of the pyridyl alkanoic acid with a primary or secondary amine, as follows:

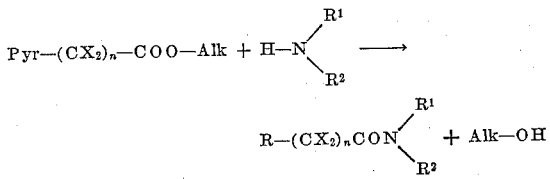

wherein $R^1$, $R^2$, X and $n$ are as above defined and Pyr denotes the 2-pyridyl radical. In carrying out such a reaction, it is advisable to employ a molar excess of the amine, such as about 5 mols of amine per mol of ester. These compounds may also be prepared by reacting the acid corresponding to the above pyridyl alkanoic ester with an amine of the formula set forth to form the corresponding ammonium salt and then subjecting the salt to thermal dehydration to form the amide at temperatures above about 185° C. but below 235° C. The (2-piperidyl)-alkanamides of our invention may be obtained by catalytic hydrogenation of the corresponding pyridyl alkanamides carried out in glacial acetic acid in the presence of a suitable catalyst, such as Adams platinum catalyst; in working up such a reaction product, the acetic acid should be removed by evaporating under reduced pressure at a temperature not higher than 50° C. to avoid decomposition of the reaction product.

If salts of the alkanamides of our invention are desired, acid addition salts such as the hydrochloride, succinate, tartrate or hydrobromide may be produced, and quaternary ammonium salts may likewise be obtained by reaction with agents as methyl iodide, dimethyl sulfate or benzyl bromide.

In preparing the compounds of our invention, the specific amine employed may be methylamine, ethylamine, propylamine, isopropylamine, n-butylamine, beta-hydroxyethylamine, beta-diethylaminoethylamine, dimethylamine, diethylamine, di-n-butylamine, morpholine, piperidine, aniline or methylaniline. The alkanoic acids or esters employed may be such compounds as (2-pyridyl)-acetic acid, beta-(2-pyridyl)-propionic acid, gamma-(2-pyridyl)-n-butyric acid, delta-(2-pyridyl)-n-valeric acid, epsilon -2-pyridyl)-n-caproic acid, or their lower alkyl esters. These compounds may be generally prepared by reacting a lower alkyl picolinate in a Claisen type condensation with a compound of the formula

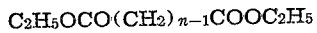

$C_2H_5OCO(CH_2)_{n-1}COOC_2H_5$ (where $n$ is as above defined) in the presence of sodium ethylate, treating the resulting product with zinc and hydrochloric acid to form the ester of the alkanoic acid and then liberating the acid, if desired, by treatment with sodium hydroxide, as described in Journal Chem. Soc., 1932, pp. 2959-2969; alkyl groups may be introduced into the alkylene chain in accordance with conventional procedures. Methyl 2-pyridyl acetate may be prepared as described by Oparina (Chem. Abs. vol. 29, p. 1820 (1935)).

Among the compounds which may be prepared in accordance with our invention may be mentioned the following:

N-ethyl - 2 - pyridylacetamide; N-methyl - N-phenyl - 2 - pyridylacetamide; N - methyl-N-phenyl - 2 - piperidylacetamide; N - methyl-beta-(2-pyridyl)-propionamide; N,N-dimethyl-beta-(2-pyridyl)-propionamide; N,N-dimethyl-beta-(2-piperidyl)-propionamide; N-ethyl-beta-(2 - pyridyl) - propionamide; N-(beta-hydroxyethyl)-beta-(2-pyridyl)-propionamide; N-(beta-diethylaminoethyl) - beta-(2-pyridyl) - propionamide; N,N-diethyl-beta-(2-pyridyl) - propionamide; N,N - diethyl-beta-(2-pyridyl)-propionamide methiodide; N,N-diethyl-beta-(2-piperidyl-propionamide; N,N-diethyl-beta-(1-methyl- 2-piperidyl)-propionamide hydroiodide; N-(n-propyl)-beta-(2-pyridyl)-propionamide; N,N-di-(n-propyl)-beta-(2-pyridyl)-propionamide; N,N-di-(n-propyl)-beta-(2-piperidyl)-propionamide; N-isopropyl-beta-(2-pyridyl)-propionamide; N,N-diisopropyl-beta-(2-pyridyl)-propionamide; N-(n-butyl)-beta-(2-pyridyl)-propionamide hydrochloride; N,-(n-butyl)-beta-(2-piperidyl)-propionamide; N,N-di-(n-butyl)-beta-(2-pyridyl)-propionamide; N,N-di-(n-butyl)-beta-(2-piperidyl)-propionamide; beta-(2-pyridyl)-propionanilide hydrochloride; beta-(2-piperidyl)-propionanilide; N-methyl-N-phenyl-beta-(2-pyridyl)-propionamide; N-methyl-N-phenyl-beta-(2-piperidyl)-propionamide; beta-(2-pyridyl)-propionpiperidide; beta-(2-piperidyl)-propionpiperidide; beta-(2-pyridyl)-propionmorpholide; N,N-diethyl-gamma-(2-piperidyl)-n-butyramide; N,N-di-(n-butyl)-delta-(2-pyridyl)-n-valeramide; N,N-di-(n-butyl)-delta-(2-piperidyl)-n-valeramide; epsilon-(2-pyridyl)-caproanilide; epsilon-(2-piperidyl)-caproanilide.

Tests on the compounds of our invention have indicated that they are of interest in the pharmaceutical field, certain of them showing antihistaminic activity and analeptic activity.

The following examples illustrate preparation of compounds of our invention:

*Example 1*

An excess of ethylamine was slowly introduced below the surface of molten beta-(2-pyridyl)-propionic acid (30.2 grams) whose temperature was maintained at 200–220° C. The unreacted amine in the vapors evolving from the reaction vessel was recovered by condensation, distilled and recycled to the reaction vessel in a continuous manner. After two hours, heating was stopped and the mixture was allowed to cool, after which it was shaken with benzene (200 cc.) and the benzene solution was washed with 50 cc. of 25% potassium carbonate solution to remove any unreacted acid. The benzene solution was dried with anhydrous potassium carbonate, the solvent was removed under vacuum and the residue was distilled giving 28.5 grams of material boiling at 119–121° C. at 0.15 mm. The liquid later crystallized into a solid melting at 47.5–48.5° C.; this product was N-ethyl-beta-(2-pyridyl)-propionamide. This amide was soluble in water and in ethanol. Analysis: Calculated for $C_{10}H_{14}N_2O$: C, 67.39; H, 7.92; N, 15.72. Found: C, 66.91; H, 7.75; N, 15.85.

*Example 2*

A mixture of methyl beta-(2-pyridyl)-propionate (33.0 grams) and n-propylamine (59.0 grams) was heated under reflux for fifteen hours. The unreacted amine was evaporated under vacuum and the residue, after two distillations, gave 10.0 grams of yellow liquid boiling at 114–115° C. at 0.1 mm. This product was N-(n-propyl)-beta-(2-pyridyl)-propionamide. This amide was soluble in water, ethanol and ether.

*Example 3*

A mixture of beta-(2-pyridyl)-propionic acid (30.2 grams) and aniline (27.9 grams) was heated at 200° C. under an air condenser for two hours. The hot mixture was then poured into one liter of water and just enough alcohol was added to effect complete solution at the boiling point. The mixture was then boiled for a few minutes with charcoal (10 grams). After filtration an oil separated out which rapidly crystallized. Upon recrystallization from aqueous ethanol, 34.0 grams of material, M. P. 109.5–110° C. were obtained. This substance was beta-(2-pyridyl)-propionanilide. This anilide was sparingly soluble in water, and was converted to the water-soluble hydrochloride as follows: The anilide (30.4 grams) was dissolved in a 0.06 normal solution of hydrogen chloride in absolute ethanol (179 cc.) and an excess of absolute ether (1800 cc.) was added thereto. The mixture was allowed to stand in the refrigerator at about 5° C. overnight. The crystals formed were then filtered off and recrystallized from a mixture of ethanol and ether, whereupon 31.2 grams of the desired water-soluble hydrochloride M. P. 203–204° C. were obtained.

*Example 4*

A mixture of methyl beta-(2-pyridyl)-propionate (33.0 grams) and beta-diethylaminoethylamine (23.2 grams) in a flask fitted with a twelve inch helix-packed column was heated in such a manner that only the methanol distilled from the top of the column. During a five hour period, the temperature of the mixture slowly rose to 205° C., at which time the reaction mixture was cooled and shaken with benzene (200 cc). The benzene solution was washed with 50 cc. of 25% potassium carbonate solution and then dried over anhydrous potassium carbonate. The benzene was removed under vacuum and the residue was fractionally distilled through a ten inch column with the wire screen packing and heated jacket to give 34.0 grams of material boiling at 150° C. at 0.06 mm. This substance was N-(beta-diethylaminoethyl)-beta-(2-pyridyl)-propionamide. This amide was soluble in water and in ethanol.

*Example 5*

The procedure described under Example 1 was followed except that diethylamine was substituted for ethylamine. The crude reaction product was distilled, giving 21.4 grams of material boiling at 107° C. at 0.1 mm.; this product was N,N-diethyl-beta-(2-pyridyl)-propionamide. This amide was very soluble in water.

*Example 6*

A mixture of N,N-diethyl-beta-(2-pyridyl)-propionamide (15.0 grams) and methyl iodide (11.4 grams) in benzene (100 cc.) was heated under reflux for one hour. An oil separated which soon crystallized. After two recrystallizations from acetone, 7.0 grams of a white, crystalline solid was obtained melting at 107.5–108.5° C. This substance was N,N-diethyl-beta-(2-pyridyl)-propionamide methiodide. This salt was very soluble in water.

*Example 7*

A solution of N,N-diethyl-beta-(2-pyridyl)-propionamide (25 grams) in glacial acetic acid (120 cc.) was reduced with hydrogen on a Parr hydrogenation shaker in the presence of Adams platinum catalyst (1.0 gram). The theoretical amount of hydrogen was taken up in about two and one-half hours. After removal of the catalyst, the acetic acid was evaporated under vacuum at a heating bath temperature not exceeding 50° C. The residue was shaken in benzene (500 cc.) and the benzene solution was washed with 25% potassium carbonate solution (240 cc.). The carbonate washings were cross-extracted with benzene (200 cc.) and the combined benzene solutions were dried over anhydrous potassium carbonate. The benzene was removed under vacuum and the residue was distilled, giving 15.5 grams of a colorless liquid boiling at 104–106° C. at 0.3 mm.; this product was N,N-diethyl-beta-(2-piperidyl)-propionamide. This amide was very soluble in water. Upon treatment of this product as described in Example 6, the compound N,N-diethyl-beta-(1-methyl-2 - piperidyl) - propionamide hydroiodide was produced.

*Example 8*

By employing methyl aniline in place of aniline in accordance with the procedure of Example 3, the compound N-methyl-N-phenyl-beta - (2 - pyridyl) - propionamide was obtained, which, upon reduction as described in Example 7, gave the corresponding piperidyl compound.

*Example 9*

By employing dimethylamine instead of diethylamine in Example 5, the compound N,N-dimethyl-beta-(2-pyridyl)-propionamide was obtained, which, upon reduction as described in Example 7, gave the corresponding piperidyl compound.

Since certain changes may be made in the products described in the above disclosure without departing from the scope of the invention, it is intended that all matter included herein be interpreted as illustrative, and not in a limiting sense.

We claim:

N-methyl-N-phenyl-beta-(2 - piperidyl) - propionamide.

JOHN A. KING.
FREEMAN H. McMILLAN.

References Cited in the file of this patent

UNITED STATES PATENTS

| Number | Name | Date |
|---|---|---|
| 2,356,587 | Hentrich et al. | Aug. 22, 1944 |
| 2,435,173 | Bavley | Jan. 27, 1948 |

FOREIGN PATENTS

| Number | Country | Date |
|---|---|---|
| 589,625 | Great Britain | June 25, 1947 |

OTHER REFERENCES

Walter et al.: Chem. Abstr., vol. 36, p. 473 (1942).

Panizzon: Chem. Abstr., vol. 40, p. 3117 (1946).